(12) United States Patent
Arnold et al.

(10) Patent No.: US 6,470,445 B1
(45) Date of Patent: Oct. 22, 2002

(54) PREVENTING WRITE-AFTER-WRITE DATA HAZARDS BY CANCELING EARLIER WRITE WHEN NO INTERVENING INSTRUCTION USES VALUE TO BE WRITTEN BY THE EARLIER WRITE

(75) Inventors: Ronny Lee Arnold; Donald Charles Soltis, Jr., both of Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/391,023

(22) Filed: Sep. 7, 1999

(51) Int. Cl.$^7$ .................................................. G06F 9/32

(52) U.S. Cl. ........................................ 712/218; 712/219

(58) Field of Search ................................ 712/216, 217, 712/218, 219, 23

(56) References Cited

U.S. PATENT DOCUMENTS 6,098,168 A * 8/2000 Eisen et al. .................. 712/218

OTHER PUBLICATIONS

Gary Lauterbach, "MicroProcessor Forum 97–Sun'Next Generation High End Sparch Microprocessor", Oct. 14–15, 1997, pp. 3–6.
Patterson, Hennessy, and Golberg, "Computer Architecture A Quantitative Approach", 1996, pp. 150–154, 191–193.

* cited by examiner

Primary Examiner—Richard L. Ellis

(57) ABSTRACT

A processing system for processing instructions of computer programs utilizes a plurality of pipelines and a control mechanism in order to detect and prevent write-after-write data hazards. The plurality of pipelines receives and processes instructions of a computer program that includes a first instruction and a second instruction. The control mechanism is designed to detect a write-after-write data hazard associated with the first instruction and the second instruction, when the first and second instruction are configured to cause data to be written to the same location. After detecting the write-after-write data hazard, the control mechanism determines whether there is another instruction in the instructions being processed by the pipelines that is dependent on the data produced or retrieved by execution of the first instruction. If there is such an instruction, the control mechanism cancels the first instruction by transmitting a cancellation request.

14 Claims, 4 Drawing Sheets

PREVENTING WRITE-AFTER-WRITE DATA HAZARDS BY CANCELING EARLIER WRITE WHEN NO INTERVENING INSTRUCTION USES VALUE TO BE WRITTEN BY THE EARLIER WRITE

BACKGROUND OF THE INVENTION

1. Field of the Invention

The present invention generally relates to computer processing techniques and, in particular, to a superscalar processing system and method that detect write-after-write data hazards while executing instructions and efficiently prevents errors from these hazards by canceling some of the instructions associated with the hazards.

2. Related Art

Parallel processing, sometimes known as superscalar processing, has been developed to reduce the amount of time required to process instructions of a computer program. In parallel processing, at least two pipelines are defined that simultaneously execute instructions. One type of parallel processing is out-of-order processing, in which each pipeline of a processor simultaneously executes different instructions independently of the other pipeline(s).

In out-of-order processing, the instructions are not necessarily input into the pipelines in the same order that they were received by the processor. In addition, it typically takes different amounts of time for different instructions to execute, and it is, therefore, possible for an instruction to be fully executed before another instruction, even though the other instruction was input into its respective pipeline first. Accordingly, instructions are not necessarily executed in the same order that they are received by the pipelines within the processor, and as a result, the complexity required to avoid errors from read-after-write data hazards and write-after-write data hazards, which will be described further below, is relatively large for out-of-order processing.

A "read-after-write data dependency" exists when one instruction to be executed by a processor utilizes, during execution, data retrieved or produced from the execution of another instruction. If the one instruction executes before the other instruction executes, then an error may occur since the one instruction may utilize incorrect data during execution. As a result, to prevent errors, steps should be taken to ensure that the instruction utilizing data retrieved or produced from the execution of another instruction does not execute until the necessary data from execution of the other instruction is available. If a read-after-write data dependency exists and if such steps are not taken, then a "read-after-write data hazard" exists, since the read-after-write data dependency may result in the utilization of incorrect data.

A "write-after-write data hazard" exists when an older instruction, during execution, may write data to the same register or other memory location written to by a younger instruction and incorrectly overwrite valid data written by the younger instruction. An instruction is "younger" than another instruction when it is received by a processor after the other instruction. Conversely, an instruction is "older" than another instruction when it is received by a processor before the other instruction.

As an example of a write-after-write data hazard, assume that a first instruction is a load instruction that retrieves data and writes the retrieved data to a particular register. If the data to be retrieved is not locally available, it may take a relatively long time for the data to be retrieved. Therefore, it is possible for another instruction (i.e., an instruction younger than the first instruction) to write data to the same register after the first instruction has executed but before the data retrieved by the first instruction is written to the register. In such a case, the data written to the register by the second instruction may be overwritten by the data retrieved by the first instruction. As a result, the register may contain incorrect data, and an error may result when a later instruction uses the data in the register. Therefore, a write-after-write data hazard exists when data produced from the execution of an older instruction may overwrite data produced from the execution of a younger instruction.

To prevent errors from read-after-write data hazards and from write-after-write data hazards, most out-of-order parallel processors employ a control mechanism. In this regard, during the execution of each instruction, the control mechanism determines whether an instruction being processed (referred to hereafter as the "pending instruction") requires data produced by the execution of an older instruction. If so, the control mechanism then determines whether the older instruction has been processed, at least to the point where the needed data is available. If this data is not yet available, the control mechanism stalls (i.e., temporarily stops) processing of the pending instruction until the necessary data becomes available, thereby preventing errors from read-after-write data hazards.

In addition, the control mechanism also determines whether data from (i.e., generated or retrieved by) an older instruction is to be written to the same register or memory location as the data from a pending instruction. If so, the control mechanism stalls the pending instruction until the data from the older instruction has been written to the register or memory address, thereby preventing errors from write-after-write data hazards. Consequently, the control mechanism may stall the pending instruction in order to prevent errors from either read-after-write data hazards or from write-after-write data hazards.

Stalling of the pending instruction is usually accomplished by asserting a stall signal transmitted to the pipeline executing the pending instruction. In response to the asserted stall signal, the pipeline is designed to stop execution of the pending instruction until the stall signal is deasserted by the control mechanism. Once the read-after-write data hazard or the write-after-write data hazard no longer exists, the control mechanism deasserts the stall signal, and in response, the pipeline resumes processing of the pending instruction. The control mechanism required to detect and prevent potential errors from read-after-write data hazards and from write-after-write data hazards is relatively complex in out-of-order processors, and as the number of pipelines is increased, the complexity of the control mechanism increases dramatically.

Consequently, many conventional parallel processors, particularly processors having a large number of pipelines, employ an in-order type of processing in lieu of the out-of-order type of processing described above. In in-order processing, the instructions being processed by the different pipelines are stepped through the stages of the pipelines on certain edges of a system clock signal. In this regard, the processing of instructions in a pipeline is usually divided into stages, and each stage of the pipeline simultaneously processes a different instruction.

As an example, the processing performed by each pipeline may be divided into a register stage, an execution stage, a detect exceptions stage, and a write stage. During the register stage, any operands necessary for the execution of an instruction are obtained. Once the operands have been obtained, the processing of the instruction enters into the execution stage in which the instruction is executed. After the instruction has been executed, the processing of the instruction enters into a detect exceptions stage in which conditions, such as overruns during execution, for example, that may indicate data unreliability are checked. After the detect exceptions stage is completed, a write stage is entered in which the results of the execution stage are written to a register.

A key feature of in-order processing is that each instruction of an issue group steps through each stage at the same time. An "issue group," as defined herein, is a set of instructions simultaneously (i.e., during the same clock cycle) processed by the same stage of different pipelines within a single processor. As an example, assume that each stage of each pipeline processes one instruction at a time, as is typically done in the art. The instructions in the detect exceptions stage of the pipelines form a first issue group, and the instructions in the execution stage of the pipelines form a second issue group. Furthermore, the instructions in the register stage of the pipelines form a third issue group. Each of the issue groups advances into the next respective stage in response to an active edge of the system clock signal. In other words, the first issue group steps into the write stage, the second issue group steps into the detect exceptions stage, and the third issue group steps into the execution stage in response to an active edge of the system clock signal.

As used herein, an "active edge" is any edge of the system clock signal, the occurrence of which induces each unstalled instruction in a pipeline to advance to the next stage of processing in the pipeline. For example, assume that a processor is designed to step each unstalled instruction into the next stage of processing every three clock cycles. In this example, the active edges could be defined as every third rising edge of the clock signal. It should be noted that which edges of the clock signal re designated as "active edges" is based on design parameters and may vary from processor to processor.

During in-order processing, any instruction in one issue group preferably does not pass another instruction in another issue group. In other words, instructions of one issue group input into the pipelines after the instructions of another issue group are prevented from entering into the same stage processing the instructions of the other issue group. Therefore, at any point in time, each stage of the pipelines is respectively processing instructions from only one issue group. Since instructions from different issue groups are prevented from passing each other, the control mechanism for controlling the pipelines and for preventing errors from read-after-write data hazards and from write-after-write data hazards is greatly simplified and is, therefore, often preferable over out-of-order processing.

In both out-of-order processing and in-order processing, certain inefficiencies exist with respect to write-after-write data hazards. As set forth hereinabove, a write-after-write data hazard exists when a pending instruction and an older instruction write to the same register or other memory location. Usually, the older instruction is writing to the register so that another instruction (hereafter referred to as the "intervening instruction") between the older instruction and the pending instruction can read the data produced or retrieved by the older instruction. However, due to branches in the program at run time or other reasons, there may be no intervening instruction (i.e., no instruction between the older instruction and the pending instruction) that actually utilizes the data produced or retrieved by the older instruction. Consequently, the data retrieved by the older instruction is not useful. However, to prevent errors from write-after-write data hazards, the processor stalls the pending instruction until the data retrieved or produced by the older instruction is written to the register. This results in undesirable inefficiencies, since the processor must wait on data that will not be used by the processor to execute the program.

Thus, a heretofore unaddressed need exists in the industry for providing a system and method of increasing the efficiency of parallel processors in preventing write-after-write data hazards.

SUMMARY OF THE INVENTION

The present invention overcomes the inadequacies and deficiencies of the prior art as discussed hereinbefore. Generally, the present invention provides a system and method for efficiently preventing errors caused by write-after-write data hazards.

In architecture, the processing system of the present invention utilizes a plurality of pipelines and a control mechanism. The plurality of pipelines receives and processes instructions of a computer program that includes a first instruction and a second instruction. The control mechanism is designed to detect a write-after-write data hazard associated with the first instruction and the second instruction, when the first and second instruction are configured to cause data to be written to the same location. After detecting the write-after-write data hazard, the control mechanism determines whether there is an intervening instruction (i.e., an instruction between the first and second instructions) that is dependent on the data produced or retrieved by execution of the first instruction. If there is no such intervening instruction, the control mechanism cancels the first instruction by transmitting a cancellation request.

In accordance with another feature of the present invention, a memory interface receives the cancellation request and, in response to the cancellation request, either stops searching for the data requested by execution of the first instruction or refrains from transmitting the data to the aformentioned location.

In accordance with another feature of the present invention, the control mechanism stalls the second instruction in response to the write-after-write data hazard and removes the stall of the second instruction when the first instruction is canceled.

The present invention can also be viewed as providing a processing method for efficiently processing instructions of computer programs. The method can be broadly conceptualized by the following steps: receiving a plurality of instructions from a computer program, the instructions including a first instruction and a second instruction; detecting a write-after-write data hazard associated with the first instruction and the second instruction; stalling the second instruction in response to the write-after-write data hazard; determining whether another instruction within the plurality of instructions is dependent on the first instruction; detecting, in the determining step, an absence of instructions within the plurality of instructions that are dependent on the first instruction; canceling the first instruction in response to the detecting an absence step; and processing the second instruction in response to the canceling step.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
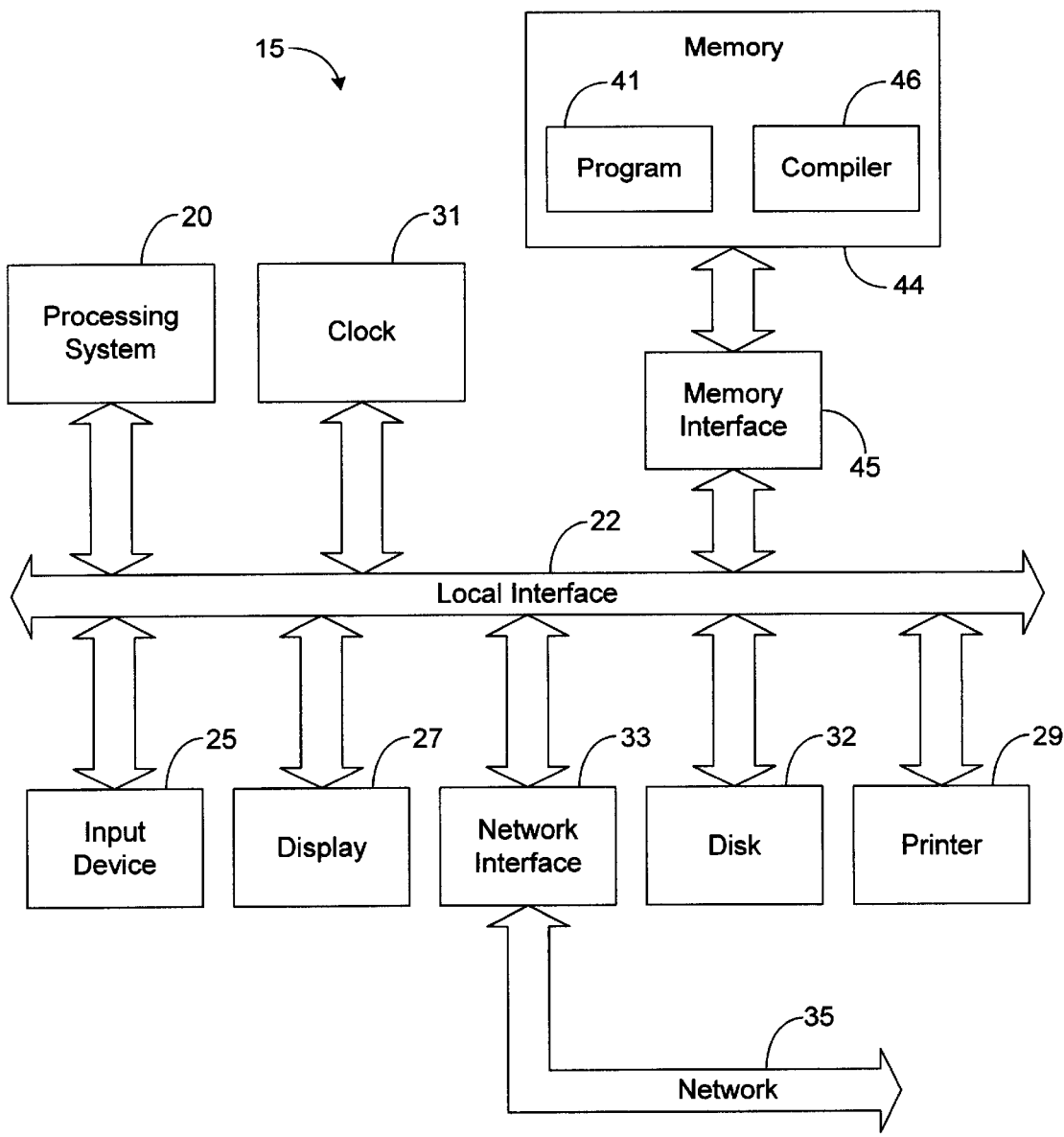
FIG. 1 is a block diagram illustrating a computer system that employs a processing system in accordance with the present invention.

The present invention relates to a superscalar processing system and method for efficiently preventing errors caused by write-after-write data hazards. FIG. 1 depicts the preferred embodiment of a computer system 15 employing the processing system 20 of the present invention. The processing system 20 of the preferred embodiment is preferably implemented in hardware, although it is possible to implement portions of the processing system 20 in software, if desired.

As shown by FIG. 1, the computer system 15 includes a local interface 22, which can include one or more buses, that allows the processing system 20 to communicate with the other elements of the computer system 15. Furthermore, an input device 25, for example, a keyboard and/or a mouse, can be used to input data from a user of the system 15, and a screen display 27 and/or a printer 29, can be used to output data to the user. A system clock 31 produces a clock signal, which is used through techniques known in the art to control the timing of data communicated by the system 15. A disk storage mechanism 32 can be connected to the local interface 22 to transfer data to and from a nonvolatile disk (e.g., magnetic, optical, etc.). If desired, the system 15 can be connected to a network interface 33 that allows the system 15 to exchange data with a network 35.

The system 15 additionally includes a program 41, a memory interface 45, and a compiler 46. The program 41 and compiler 46 are preferably stored in memory 44. The memory interface 45 is designed to receive retrieval requests from other devices of the system 15 and to retrieve data from memory 44 in response to the retrieval request. The memory interface 45 may check various portions of memory 44 to locate the requested data. For example, memory 44 often comprises various types of storage devices, such as memory caches, registers, RAM, ROM, etc., and the interface 45 may first issue a search of the memory caches to search for the requested data. If the interface 45 fails to find the requested data in the caches, the interface 45 may then issue a search of RAM and/or other types of storage devices until the requested data is located. The interface 45 may even issue a search through network interface 33 and network 35 to locate the requested data in a remote system. Therefore, to locate the requested data, it may take anywhere from one or two clock cycles to several thousand clock cycles, depending on how many searches are performed and where the requested data is located. Once the memory interface 45 has located and retrieved the requested data, the interface 45 transmits the retrieved data to an address indicated by the associated retrieval request that prompted the retrieval.

The program 41 includes instructions that are to be processed and executed by the processing system 20. When the program 41 is to be executed, the instructions of the program 41 are retrieved and are transmitted to the processing system 20 by the memory interface 45. Before transmitting the instructions of the program 41 to the processing system 20, the instructions are preferably first translated by the compiler 46 into a form compatible with the processing system 20. For example, if the instructions of the program 41 are written in a high level computer language, for example, C or Fortran, then the compiler 46 is designed to translate the instructions into a machine language that is compatible with the processing system 20.

Figure 2:
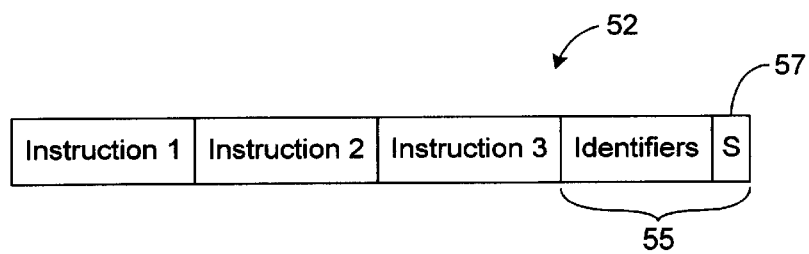
FIG. 2 is a block diagram illustrating a exemplary bundle of instructions transmitted to the processing system depicted in FIG. 1.

In the preferred embodiment, the compiler 46 defines instruction bundles that include the translated instructions and that can be transmitted directly to the processing system 20. FIG. 2 depicts an instruction bundle 52 in accordance with the principles of the present invention. As shown by FIG. 2, each bundle 52 includes data defining one or more instructions, and each bundle 52 also includes a header 55. The header 55 includes identifier information that identifies the type of instructions that are included in the bundle 52. For example, the header 55 may include information indicating that the first instruction in the bundle 52 is a memory operation instruction, that the second instruction in the bundle 52 is an integer operation instruction, that the third instruction in the bundle 52 is a floating point operation, etc. The header 55 also includes a stop bit 57, which will be described in more detail hereinbelow.

In defining the instruction bundles 52, the compiler 46 is preferably designed to check for read-after-write data hazards and write-after-write data hazards and to ensure that no two instructions defining a read-after-write data hazard or a write-after-write data hazard are placed in the same bundle 52. In addition, the compiler 46 is designed to consecutively transmit the bundles 52 to processing system 20 in a particular order (referred to as "program order"), and the compiler 46 is preferably designed to ensure that no read-after-write data hazards or write-after-write data hazards exist between instructions in bundles 52 that are bounded by asserted stop bits 57. Therefore, if the processing system 20 receives a string of instruction bundles 52 having deasserted stop bits 57, then the processing system 20 is aware that none of the instructions in the string is dependent on any of the other instructions in the string or that none of the instructions in the string writes data to the same register as any of the other instructions in the string.

It should be noted that transmitting the instructions to the processing system 20 in the instruction bundles 52 described hereinabove helps to improve the optimal performance of the system 20. However, it is not necessary for the instructions to be transmitted to the processing system 20 in the bundles 52 described hereinabove. Any technique for transmitting the instructions to the processing system 20 should be suitable for implementing the present invention.

Figure 3:
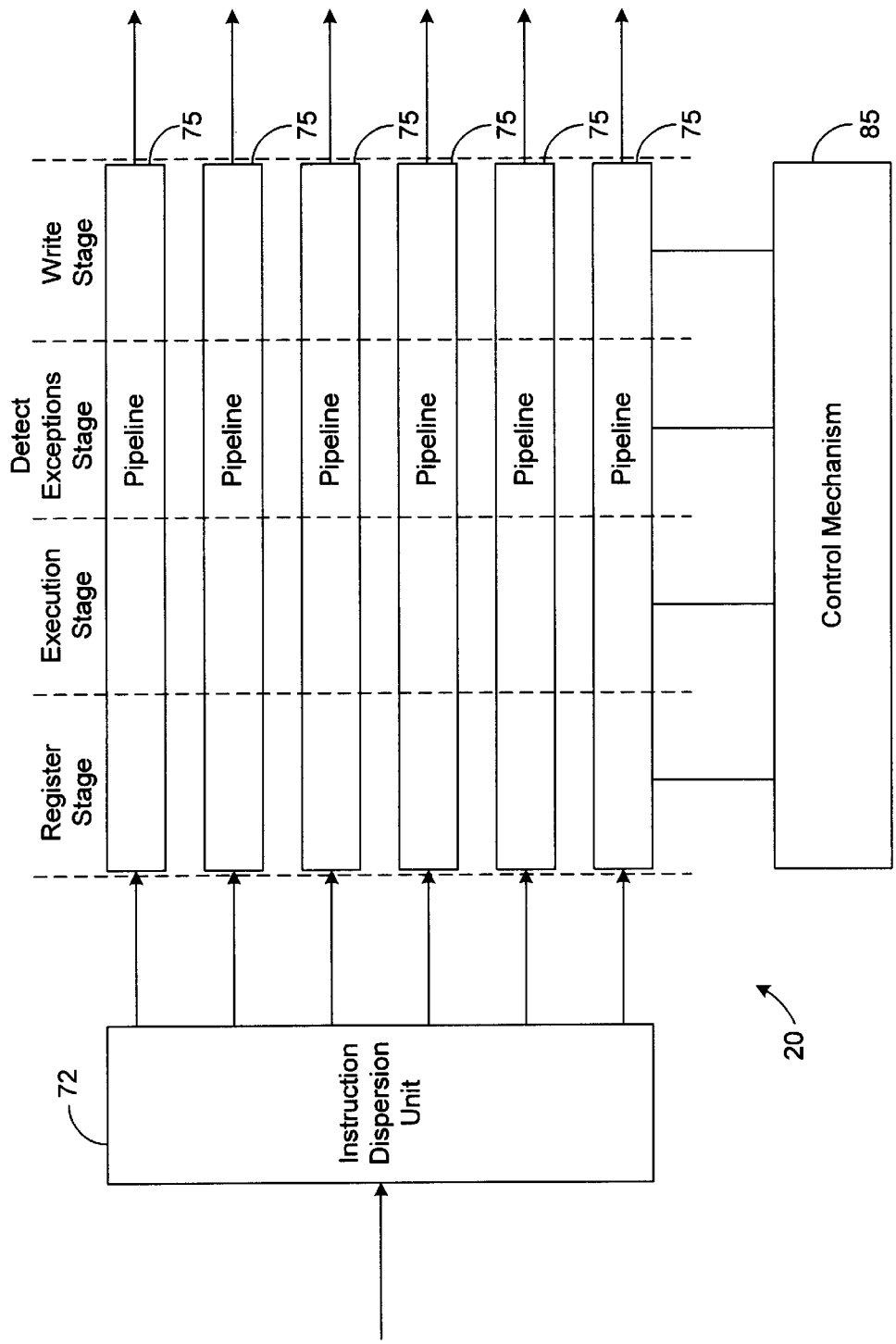
FIG. 3 is a block diagram illustrating a more detailed view of the processing system depicted in FIG. 1.

As shown by FIG. 3, the processing system 20 includes an instruction dispersal unit (IDU) 72 that is designed to receive the instructions transmitted to the processing system 20. The IDU 72 is configured to define issue groups with the instructions received by the IDU 72 and to transmit the instructions of a single issue group to pipelines 75 such that each instruction of the issue group is received by only one of the pipelines 75 and each pipeline 75 receives no more than one of the instructions. The pipelines 75 are designed to further process and execute the received instructions. Similar to conventional pipelines in parallel in-order processors, the pipelines 75 preferably process the received instructions in stages.

Figure 4:
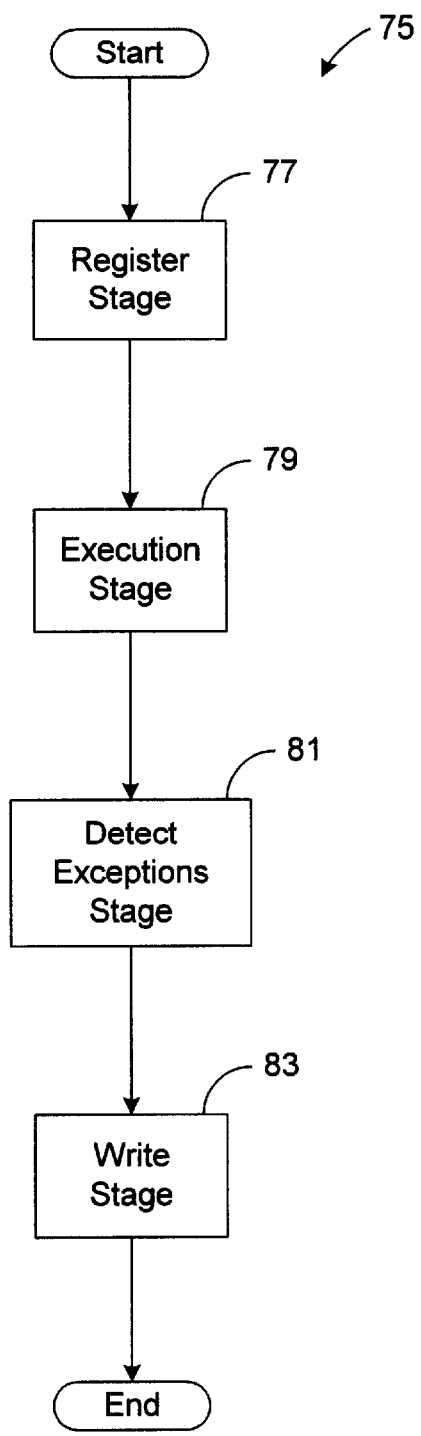
FIG. 4 is a flow chart illustrating the processing stages of the processing system depicted in FIG. 1.

FIG. 4 depicts an exemplary set of stages for the pipelines 75. In this regard, each of the pipelines 75 receives an instruction and sequentially processes the instruction in a register stage 77, in an execution stage 79, in a detect exceptions stage 81, and finally in a write stage 83. These stages are described in more detail in the Background section, and it should be noted that other stages and/or other combinations of stages may be utilized to process and execute the instructions.

In defining the issue groups, the IDU 72 is preferably designed to ensure that each instruction is only transmitted to a pipeline 75 compatible with the instruction. In this regard, some of the pipelines 75 may only be designed to handle certain types of instructions. For example, one or more of the pipelines 75 may be configured to only handle memory operation instructions, integer operation instructions, floating point instructions, or other known types of instructions. Accordingly, the IDU 72 is designed to analyze the received instructions and to define the issue groups such that appropriate types of instructions are transmitted to each pipeline 75. In the preferred embodiment, the IDU 72 may analyze the header 55 of each instruction bundle 52 to determine which instructions are compatible with which pipelines 75.

The IDU 72 is also designed to ensure that two instructions defining a read-after-write data hazard or a write-after-write data hazard are not placed in the same issue group. Therefore, each instruction that enters into the first stage of processing (i.e., the register stage 77 in the preferred embodiment) on an active edge of the clock signal produced by clock 31 has no read-after-write data dependencies with any of the other instructions entering into the first stage on the same clock edge. Further, each instruction that enters into the first stage of processing on the edge of the clock signal also does not write data to the same register or memory location as any of the other instructions entering into the first stage on the same clock edge. Since the stop bits 57 of the instruction bundles 52 indicate whether read-after-write data hazards or write-after-write data hazards exist between the instructions of consecutive instruction bundles 52, as described hereinabove, the IDU 72 may utilize the stop bits 57 to simplify the process of defining issue groups. In this regard, the IDU 72 may place any of the instructions of a string of bundles 52 having deasserted stop bits 57 into the same issue group without checking for read-after-write data hazards or write-after-write data hazards between the instructions, since the compiler 46 has guaranteed, via assertion/deassertion of the stop bits 57, that there are no read-after-write data hazards or write-after-write data hazards between these instructions.

The IDU 72 is further designed to ensure that younger instructions do not complete the processing of pipelines 75 before older instructions. In this regard, it is well known that the processing of instructions should be completed in the same order (referred to as "program order") defined by the original program 41. The program order is the order that the instructions are received by the processing system 20.

Each instruction's age is based on its location within the program order. For example, the first instruction to be executed in a program 41 (i.e., the first instruction of a program 41 that is transmitted to processing system 20) is the oldest instruction, and all other instructions of the program are younger than this instruction. The next instruction to be executed after the first instruction (i.e., the next instruction of a program 41 that is transmitted after the first instruction) is younger than the first instruction but older than the rest of the instructions of the program 41. Moreover, the last instruction that should be executed is the youngest instruction. Even though superscalar processors process multiple instructions at once, the instructions should complete processing (i.e., complete the write stage 83 in the example described hereinbefore) in the same order as if a non-superscalar processor were stepping through the program 41 and processing the instructions one at a time. To ensure that younger instructions do not complete processing prior to older instructions, the IDU 72 preferably does not assign an older instruction to an issue group that will be transmitted to pipelines 75 after an issue group containing a younger instruction.

Once the issue groups have been defined, the IDU 72 is designed to sequentially transmit each issue group in an in-order fashion to the pipelines 75. Therefore, each instruction within an issue group is transmitted to its respective pipeline 75 on the same active edge of the clock signal. Ideally, each instruction within each issue group is completely processed in its respective stage between active edges of the clock signal such that each instruction in the issue group steps into the next stage on the same clock edge. Therefore, each instruction of the issue group in the register stage 77 enters into the execution stage 79 on the same clock edge that the instructions of the issue groups in execution stage 79 and detect exceptions stage 81 respectively step into the detect exceptions stage 81 and the write stage 83. Furthermore, as the instructions of the issue groups in the register stage 77, execution stage 79, and detect exceptions stage 81 step into the next respective stage, instructions of a new issue group step into the register stage 77. As a result, the processing of the issue groups is in-order in that no instruction from one issue group enters into the same stage as an instruction in another issue group.

As shown by FIG. 3, the processing system 20 preferably includes a control mechanism 85 coupled to pipelines 75. For simplicity, FIG. 3 shows control mechanism 85 coupled to only one pipeline 75. However, it should be noted that in the preferred embodiment, the control mechanism 85 is similarly coupled to the other pipelines 75. The control mechanism 85, through conventional techniques, detects read-after-write data hazards and write-after-write data hazards for the instructions being processed by the pipelines 75. If the control mechanism 85 determines that further processing of an instruction being processed by the pipelines 75 may result in an error due to a read-after-write data hazard or a write-after-write data hazard, then the control mechanism 85 is designed to stall the instruction. In this regard, the control mechanism 85 transmits a stall signal to the pipeline 75 processing the instruction, and the pipeline 75, in response, stops further processing of the instruction. Furthermore, the control mechanism 85 is also designed to transmit a stall signal to each stage of each pipeline 75 processing a younger instruction to stall the younger instructions, thereby preventing the younger instructions from completing the processing of pipelines 75 prior to the stalled instruction.

As an example, assume that control mechanism 85 determines that a first instruction in the write stage 83 of one of the pipelines 75 writes data to the same register as a second instruction in the execution stage 79 of another of the pipelines 75 and that a write-after-write data hazard exists between the two instructions. As a result, the control mechanism 85 is designed to stall the second instruction. In this regard, the control mechanism 85 asserts a stall signal transmitted to the execution stage 79 of each of the pipelines 75, which stop the processing of the instructions in the execution stage 79 in response to the asserted stall signal. Furthermore, to preserve the in-order nature of the processing, the control mechanism 85 also asserts a stall signal transmitted to the register stage 77 (i.e., the stages executing instructions younger than the instruction to be stalled) of each of the pipelines 75. Therefore, each of the instructions in the execution stage 79 and the register stage 77 of each of the pipelines 75 is stalled, while the instructions in the detect exceptions stage 81 and the write stage 83 of each of the pipelines 75 are allowed to continue processing (assuming that none of the instructions in the detect exceptions stage 81 and the write stage 83 need to be stalled to prevent another read-after-write data hazard or write-after-write data hazard).

It should be noted, however, that it may be possible to stall the second instruction in a stage 77, 79, 81, or 83 while allowing some of the other instructions in the same stage 77, 79, 81, or 83 to continue processing. In this regard, U.S. Patent Application entitled "Superscalar Processing System and Method For Efficiently Performing In-order Processing of Instructions," Attorney Docket No. 10971338, and filed by the present inventors, which is incorporated herein by reference, describes a system and method of stalling an instruction, while allowing some of the other instructions in the same stage to continue processing. The techniques described in the foregoing patent application could be employed by the system 20 to allow some of the instructions in the same stage (i.e., the execution stage 79 in the example described hereinbefore) to continue processing while the second instruction is stalled.

To ensure that an error as a result of the write-after-write data hazard does not occur, conventional processing systems typically wait until the data from the aforementioned first instruction is written to the register before deasserting the aforementioned stall signals transmitted to the execution stage 79 and the register stage 77 of the pipelines 75. However, in the preferred embodiment, the control mechanism 85 is designed to determine whether or not there is an intervening instruction (i.e., an instruction that is younger than the first instruction and older than the second instruction) that utilizes the data to be written by the first instruction. If there is an intervening instruction that utilizes data to be written as a result of execution of the first instruction, the control mechanism 85, similar to conventional systems, waits for the data of the first instruction to be written before removing the stall of the second instruction. However, if there is no such intervening instruction, then the control mechanism 85, unlike conventional systems, is configured to cancel the first instruction and to remove the stall to the second instruction without the data from the first instruction ever being written to the register.

The control mechanism 85 is configured to cancel the first instruction by transmitting a cancellation request to memory interface 45. As stated hereinabove, the interface 45 retrieves data in response to retrieval requests and transmits the retrieved data to the address indicated by the retrieval request. As a result, the interface 45 should be in the process of searching for or retrieving the data requested during the execution of the first instruction when the interface 45 receives the cancellation request.

In response to the cancellation request, the interface 45 is configured to stop searching for the data requested by the first instruction. Therefore, the interface 45 issues no new searches for the requested data. Furthermore, by the time the cancellation request is received, it is possible for the interface to have already retrieved the requested data from memory 44 or for the interface 45 to have already issued a search that eventually retrieves the requested data from memory 44. In such a situation, the memory interface 45 is configured to discard the retrieved data or to at least refrain from transmitting the retrieved data to the address indicated by the retrieval request (i.e., to refrain from transmitting the retrieved data to the register that is to be written by the second instruction).

Consequently, once the cancellation request is received by interface 45, the first instruction is effectively canceled, assuming that the data requested by the first instruction has not already been written to the address specified by the retrieval request, and the write-after-write data hazard, therefore, no longer exists. If the interface 45 has already written the requested data to the address, then the write-after-write data hazard no longer exists. Therefore, once the processing system 20 ensures that interface 45 has received the cancellation request, the control mechanism 85 is configured to remove the stall of the second instruction by deasserting the stall signal transmitted to the stage 79 of the pipeline 75 processing the second instruction. Furthermore, since each instruction in the register stage 77 and the execution stage 79 were also stalled in response to the aforementioned write-after-write data hazard, the control mechanism 85 is also configured to deassert the stall signals transmitted to stages 77 and 79 of the pipelines 75. As a result, the pipelines 75 are enabled to process the instructions in the execution stage 79 and the register stage 77, and the processing of these instructions resumes (assuming there are no other instructions in these stages that need to be stalled as a result of other hazards or other conditions that may cause a stall).

There are various methodologies that may be employed to determine whether or not there is an intervening instruction that utilizes the data written by the first instruction. In the preferred embodiment, the control mechanism 85 is configured to detect the absence of such an intervening instruction by detecting that each instruction in the later stages (i.e., the detect exceptions stage 81 and the write stage 83 in the example described hereinbefore) has stepped completely through the write stage 83 or one of the other stages 77, 79, or 81. In this regard, if an intervening instruction utilizing the data of the first instruction exists, then the intervening instruction will be stalled in one of the stages until the data produced or retrieved by the first instruction is written to the register, since a read-after-write data hazard between the first instruction and the intervening instruction exists until the data from the first instruction is written to the register.

Consequently, if all of the instructions in the later stages of pipelines 75 have passed the stage where an intervening instruction dependent on the first instruction (i.e., utilizes the data produced or retrieved by the first instruction) should stall and if the data generated or retrieved by the first instruction has not been written to the register, then the control mechanism 85 should be aware of the absence of an intervening instruction that utilizes the data produced or retrieved by the first instruction. In this situation, the control mechanism 85 is configured to cancel the first instruction and to remove the stall to the second instruction, as described hereinabove, so that processing of the second instruction can resume without waiting for the data from the first instruction to be written to the register. Consequently, the efficiency of the processing system 20 is improved.

It should be noted that the present invention has been described hereinabove in the context of in-order processing. However, the principles of the present invention may be applied to out-of-order processing. In this regard, out-of-order processors, similar to in-order processors, wait for data from an older instruction to be written to a register before data from a younger instruction is written to the same register. However, if the older instruction can be canceled, as described hereinabove, by transmitting a cancellation request to memory interface 45 when an intervening instruction utilizing the data to be written by execution of the older instruction does not exist, then the younger instruction may execute sooner. Accordingly, it should be apparent to one skilled in the art that the principles of the present invention may be employed by other types of processing systems, if desired.

Furthermore, the present invention has been described as stalling the second instruction in the execution stage 79. However, it should be noted that the second instruction may, in response to a write-after-write data hazard, be similarly stalled in any of the stages 77, 79, 81, or 83.

OPERATION

The preferred use and operation of the processing system 20 and associated methodology are described hereafter.

Instructions from a computer program 41 are compiled by a compiler 46 and transmitted to processing system 20 (FIG. 1). An IDU 72 (FIG. 3) in the processing system 20 receives the instructions and separates the instructions into issue groups, which are sets of instructions that do not have read-after-write data hazards nor write-after-write data hazards between the other instructions of the set. The issue groups are then sequentially stepped into and through the stages 77, 79, 81, and 83 of the pipelines 75 on active edges of the clock signal produced by system clock 31. Therefore, in the absence of a stall, instructions in any of the stages 77, 79, 81, or 83 advance into the next stage on the same edges of the clock signal, and any instruction from one issue group never enters into the same stage 77, 79, 81, or 83 where an instruction from another issue group is currently being processed in any of the pipelines 75.

Figure 5:
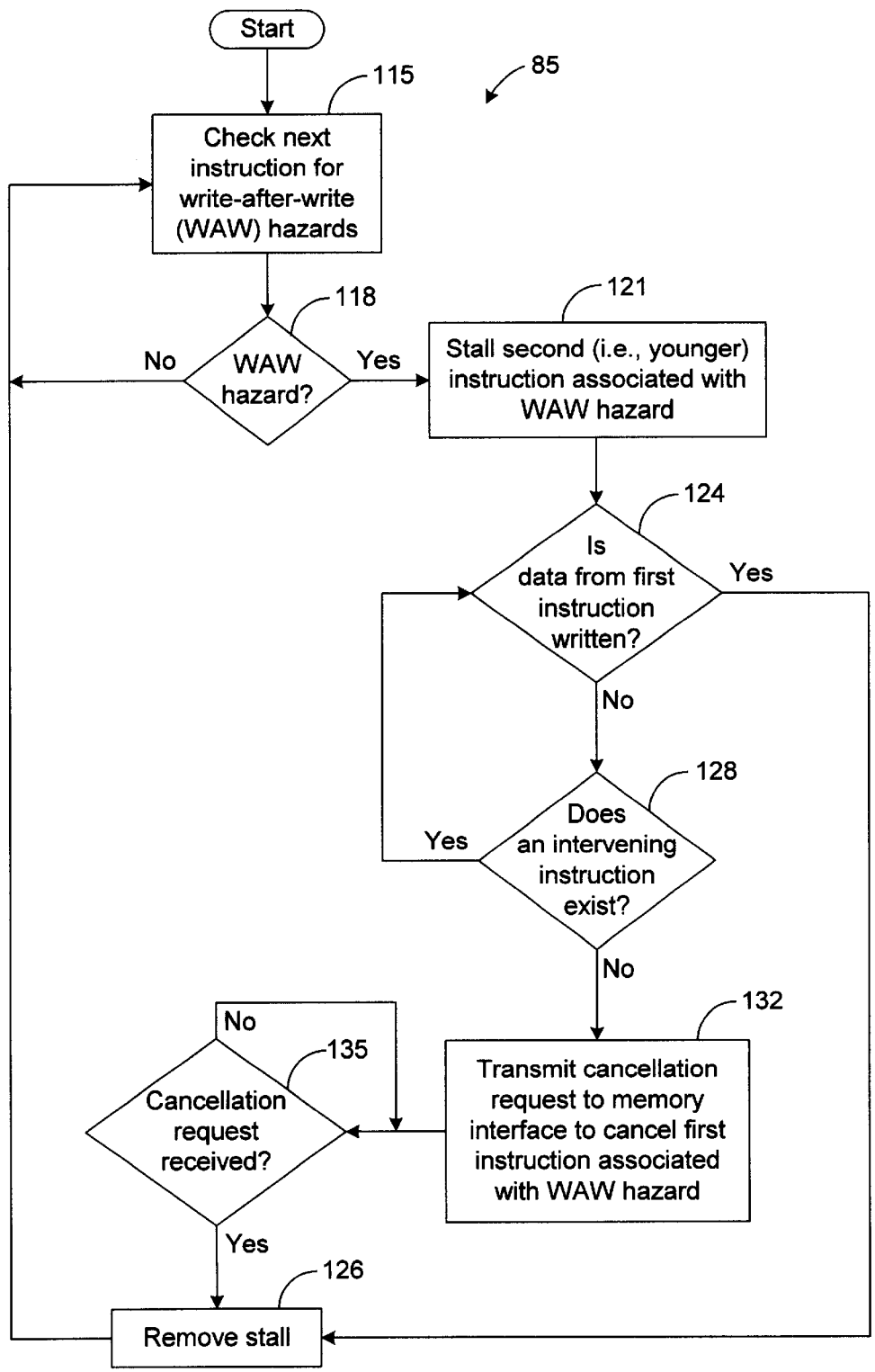
FIG. 5 is a flow chart illustrating the architecture and functionality of the control mechanism depicted in FIG. 3.

The control mechanism 85 monitors the data being processed by the pipelines 75, through conventional techniques, to determine if any write-after-write data hazards exist for the instructions being processed by the system 20, as shown by blocks 115 and 118 of FIG. 5. If the control mechanism 85 detects that a write-after-write data hazard exists between a first instruction and a second instruction, then the control mechanism stalls the second instruction (i.e., the younger instruction), as shown by blocks 118 and 121. In this regard, the control mechanism 85 asserts a stall signal transmitted to the stage 77, 79, 81, or 83 of the pipeline 75 that is processing the second instruction. In response, the aforementioned stage 77, 79, 81, or 83 stops processing the instruction (i.e., prevents the instruction from entering into the next stage of the pipeline 75). To maintain in-order processing, it may be necessary to stall other instructions, particularly instructions younger than the second instruction, being processed by the pipelines 75.

After stalling the second instruction, the control mechanism 85 determines whether the data produced or retrieved by the first instruction is written to the register associated with the write-after-write data hazard, as depicted by block 124. If this occurs, then there is no longer a write-after-write data hazard, and the aforementioned stall signal can be deasserted to remove the stall on the second instruction, as shown by block 126. However, if this has not yet occurred, the control mechanism 85 determines whether there is an intervening instruction (i.e., an instruction to be executed between the first instruction and the second instruction) that utilizes (e.g., reads) the data in the register that the first and second instructions are to write, as shown by block 128. In other words, the control mechanism 85 determines whether any other of the instructions being processed by pipelines 75 has a read-after-write data dependency with (i.e., is dependent on) the first instruction. If there is such an intervening instruction, the control mechanism 85 waits for the data from the first instruction to be written before deasserting the aforementioned stall signal, as shown by blocks 124, 126, and 128. If the control mechanism 85 determines that there is no intervening instruction that utilizes the data to be written by the first instruction, the control mechanism 85 transmits a cancellation request to memory interface 45 to cancel the first instruction, as shown by block 132.

In the preferred embodiment, the control mechanism 85 performs the functionality of block 128 by monitoring the instructions being processed by the pipelines 75 to determine whether each instruction in each issue group older than the issue group of the second instruction has been fully processed by the pipelines 75 or has at least been fully processed by a particular one of the stages 77, 79, 81, or 83. If this occurs, then the control mechanism 85 is aware that no such intervening instruction exists, since such an intervening instruction would have been stalled as the result of a read-after-write data hazard associated with the intervening instruction and the first instruction.

In response to the cancellation request, the interface 45 stops searching for the data requested by the first instruction. Furthermore, if the interface 45 has already retrieved the requested data or is in the process of retrieving the requested data when the cancellation request is received, the interface 45 refrains from transmitting the requested data in response to the cancellation request. As a result, the first instruction is effectively canceled, even though the first instruction has been executed by the processing system 20.

The control mechanism 85 determines in block 135 when the cancellation request has been received by the interface 45. The control mechanism 85 can perform this functionality through various methodologies. In the preferred embodiment, the control mechanism 85 performs block 135 by waiting a predetermined amount of time that should be sufficient for the cancellation request to be transmitted from processing system 20 to interface 45. Once the control mechanism 85 ensures that the cancellation request has been received by the interface 45, the control mechanism 85 deasserts the stall signal being transmitted to the stage 77, 79, 81, or 83 stalling the second instruction, as shown by block 126. In response, processing of the second instruction by pipelines 75 is resumed. Furthermore, if other instructions were stalled to preserve the in-order processing of the system 20 when the second instruction was stalled, then the control mechanism 85 in block 126 is also configured to remove the stall to these instructions as well.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

Now, therefore, the following is claimed:

1. A superscalar processing system, comprising:

a plurality of pipelines configured to execute instructions, in parallel, the executed instructions including a first instruction for writing to a first memory location and a second instruction for writing to the first memory location;

a memory interface configured to search for data in response to executions of the instructions by the pipelines, the memory interface further configured to retrieve the data and to write the data to memory locations identified by the instructions; and a control mechanism configured to detect whether there are any intervening instructions, between the first and second instructions, for reading from the first memory location, the control mechanism further configured to transmit a cancellation request to the memory interface if the control mechanism detects an absence of any such intervening instructions, wherein the memory interface, in response to the cancellation request, is further configured to ensure, after initiating a search for a particular set of data in response to execution of the first instruction, that any results of the search are not written to the first memory location.

2. The system of claim 1, wherein the control mechanism is configured to stall the second instruction and to then enable processing of the second instruction upon ensuring that the memory interface has received the cancellation request.

3. The system of claim 1, wherein the control mechanism is configured to detect the absence of the intervening instructions based on whether the intervening instructions are stalled.

4. The system of claim 1, wherein the memory interface ensures that any results of the search are not written to the first memory location by canceling the search.

5. The system of claim 1, wherein the memory interface ensures that any results of the search are not written to the first memory location by discarding a result of the search.

6. A superscalar processing system, comprising:

a plurality of pipelines configured to receive a plurality of instructions of a computer program and to process said instructions, said instructions including a first instruction and a second instruction, one of said pipelines configured to stall said second instruction when a stall signal is asserted and configured to resume processing of said second instruction when said stall signal is deasserted; and a control mechanism coupled to said pipelines, said control mechanism configured to detect a write-after-write data hazard associated with said first and second instructions, said control mechanism further configured to assert said stall signal in response to said write-after-write data hazard, said control mechanism further configured to determine whether other instructions within said plurality of instructions are dependent on said first instruction and to cancel said first instruction when said control mechanism fails to determine that any of said other instructions is dependent on said first instruction, said control mechanism further configured to deassert said stall signal upon cancellation of said first instruction.

7. A superscalar method, comprising the steps of:

receiving a plurality of instructions from a computer program, said instructions including a first instruction and a second instruction;

detecting a write-after-write data hazard associated with said first instruction and said second instruction;

stalling said second instruction in response to said detecting step;

determining whether another instruction within said plurality of instructions is dependent on said first instruction;

detecting, via said determining step, an absence of instructions within said plurality of instructions that are dependent on said first instruction;

canceling said first instruction in response to said detecting an absence step; and terminating said stalling step in response to said canceling step.

8. The method of claim 7, wherein said canceling step includes the step of transmitting a cancellation signal, said method further comprising the steps of;

searching for data associated with said first instruction; and ending said searching step in response to said cancellation signal.

9. The method of claim 7, wherein said canceling step includes the step of discarding data associated with said first instruction.

10. The method of claim 7, further comprising the steps of:

defining issue groups based on said instructions, each of said issue groups including instructions to be simultaneously processed by a plurality of computer pipelines;

sequentially transmitting said issue groups to said computer pipelines; and processing said issue groups via said computer pipelines in stages, wherein said determining step further includes the step of analyzing whether each instruction in at least one of said issue groups has been completely processed by at least one stage.

11. A superscalar processing system, comprising:

a plurality of pipelines configured to execute instructions of a computer program;

a memory interface configured to store and retrieve data in response to execution of the instructions; and a control mechanism configured to detect a write-after-write data hazard between a first and a second instruction during execution of the instructions, the first instruction for writing data to a register, the control mechanism further configured to detect the absence of any intervening instructions that utilize the data and configured to transmit a cancellation request to the memory interface upon detection of the absence of any intervening instructions.

12. A superscalar processing method, comprising the steps of:

executing a first instruction, the first instruction configured to write first data to a register;

executing a second instruction, the second instruction configured to write second data to the register;

detecting a data hazard associated with the first and the second instructions;

stalling the second instruction in response to the detected data hazard;

detecting an absence of intervening instructions configured to use the first data;

transmitting a cancellation request to a memory interface upon detection of the absence of the intervening instructions;

ensuring that the cancellation request is received by the memory interface; and terminating the stalling step upon completion of the ensuring step.

13. The method of claim 12 further comprising the step of preventing, in response to the cancellation request, the first data from being written to the register.

14. The method of claim 12 further comprising the steps of terminating retrieval of the first data in response to the cancellation request.

* * * * *